Oct. 23, 1962 — R. E. WINTERS — 3,059,503
AUTOMATIC ENERGY EQUALIZER
Filed Sept. 13, 1960

INVENTOR
Robert E. Winters

3,059,503
AUTOMATIC ENERGY EQUALIZER
Robert E. Winters, Ashtabula County, Ohio
Filed Sept. 13, 1960, Ser. No. 55,762
2 Claims. (Cl. 74—711)

This invention relates to an automatic gear type energy equalizer with a flexible center of balance for receiving and distributing energy of unequal proportions. It consists of a casing journalled for rotation, supporting within it two opposed bevel driven gears in connection with two bevel pinion gears, to form a balancing unit with an internal gear co-acting with a spur gear for automatically regulating the flexible balancing center to determine the required balancing point of two unequal units or proportions.

It is also an object of the invention to provide an energy equalizer with an automatic regulator that will conserve energy that otherwise would be lost through inaccurate distribution of energy. It is also an object of the invention to provide a gear type energy equalizer that is extremely simple in construction, and with a minimum number of parts will be reliable in operation and not easily gotten out of order, and will be light in weight in comparison with the energy transmitted. It is a further object of the invention to provide a means that can overcome wheel slippage due to insufficient traction when applied to farm tractors, and vehicles of transportation, and also machinery for construction purposes both mobile and stationary, where a balancing unit of this type could be applied. It is also an object of the invention, to provide a combination of gears suitably arranged, that will automatically select and deliver energy to separate units, each unit automatically receiving the quantity of energy it is capable of resisting, such as; equalizing of braking systems.

With the foregoing objects outlined, and with other objects in view, my invention consists of the novel features hereinafter described in detail, and illustrated in the accompanying drawings, and more particularly pointed out in the appended claims.

Referring to the drawings.

Figure 1:
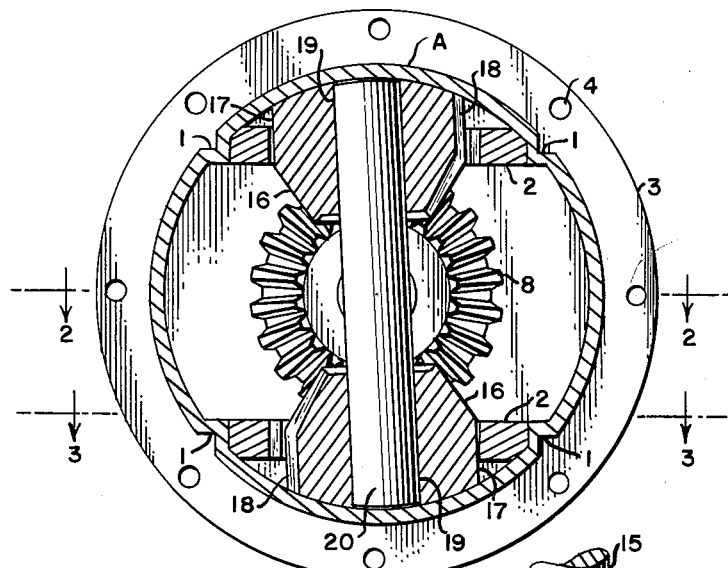
FIG. 1 is a vertical central sectional view of my improved automatic energy equalizer taken on the line 1—1 of FIG. 2.
Figure 2:
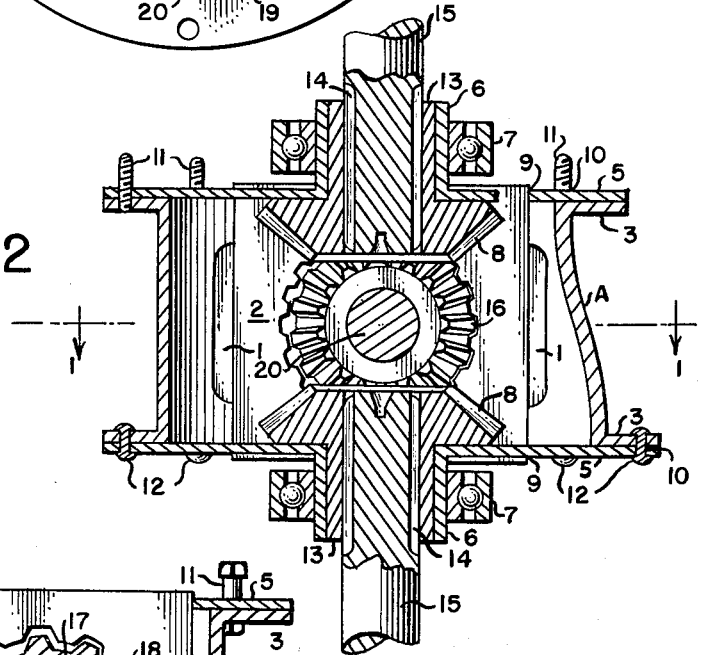
FIG. 2 is a central sectional view, taken on the line 2—2 and line 3 of FIG. 1.

In the drawings A designates the casing which is cylindrical shaped. There are four journal guides 1, spaced at 90 degree intervals, positioned parallel with each other, formed in the wall of the casing A and extending inwardly for the journal guides to strengthen the internal gear 2. The casing A is flanged 3 directly opposite ends, and drilled 4 on the face portions for mounting to the extruded hub flange 5. The hub 6 of the flanges 5 is machined on the outer surface for carrier bearing 7, and is centrally machined for journalling the bevel driven gears 8 for rotation.

Suitably positioned on the flange 5 and diametrically opposite each other are the elongated slots 9 arranged parallel with each other, these slots 9 act as journal guides for positioning the internal gear 2, thus permitting it to be reciprocated slightly. Near the outer edge of the flange 5 are connection holes 10 equally spaced for connection to the casing A, by using the bolts 11, and rivets 12. The bevel driven gears 8, are journalled for independent rotation, and are positioned directly opposite and parallel on the same axis center. It is through these gears the energy is distributed to different locations. The bearing hubs 13 on the bevel gears 8 are machined on the outer surface for journalling. The central portion of the hub is bored and splined 14 for journalling the driving shaft 15. The axis position of the bevel driving gears 8, and the bevel pinion gears 16 are on the four equal spaces at 90 degree intervals.

The bevel pinion gears 16 have a hub 17 on the large end. This hub portion is integral with the pinion blank. The gear teeth of the bevel pinion 16 are cut at the proper angle to conform with the cutting of the bevel driven gears 8. The hub 17 of this bevel pinion gear 16 is used as a spur gear 18, and gear teeth are cut bearing the same number and circular pitch, and on the same pitch diameter as the bevel pinion gear 16. The teeth of spur gear 18 on the hub 17 are cut in exact alignment as to number with the gear teeth of the bevel pinion 16. The spur gear teeth on the hub 17 of the bevel pinion pinion gear 16 are cut in parallel alignment in respect to the axis of the bevel pinion gear 16. The curvature of the teeth of the spur gear 18 cut on the hub 17 do not correspond with the curvature of the teeth of the pinion gear 16, as the addendum and the dedendum of the spur gear 18 has been reduced to a point sufficient to operate with an internal gear 2 containing one more gear tooth than the spur pinion gear 18, thus eliminating tooth interference. A hole 19 is centrally bored through the bevel pinion gear 16 to permit rotation through using the bevel pinion aligning shaft 20, which is positioned for slight rotation, so as to follow the orbit of the internal gear 2. The aligning shaft 20 is diametrically centralized within the casing A walls.

The internal gear 2 has one more gear tooth than the spur hub gear 18, the curvature, circular and diametral pitch, must conform to, and operate with, the spur pinion gear 18. The addendum and dedendum of the gear teeth in internal gear 2 must also be reduced to correspond with the spur gear 18. The internal gear 2 is formed a square blank, and the diametrical center of the internal gear 2 is centrally positioned in the square blank, and the two sides of the blank diametrically opposite are used as journalling guides. The internal gear 2 does not rotate on an axis, but has orbit rotation, the scope of the orbit is governed by the difference in pitch diameter between the internal gear 2 and the spur pinion gear 18. This internal gear 2 is held in position by the elongated slots 9 in the flange 5, as positioning journals. This orbit rotation is accomplished through the rotary action of the casing A and the rotary action of the aligning shaft 20 and the reciprocal movement of the internal gear 2, which is journalled by the elongated slots 9 in the face of the extruded hub flange 5. The scope of the orbit should be of the smallest dimension possible so that the central axis alignment of the internal gear 2 and the spur pinion gear 18 are positioned to the same axis as near as possible.

Having thus described the construction; I will now describe the operation.

Assuming that the parts are in the position shown in FIG. 1, a suitable means has been connected to the bolts 11 to rotate the casing A, and as the casing A revolves the cluster of gears 8—16—18—2 revolve as a unit with the casing A, and no independent action will be created among the separate gears of the cluster. In this position the unit is centrally balanced, but, when the beveled driven gears 8 are subjected to unequal portions of energy, the spur gear 18, and the bevel pinion gear 17, will proceed to revolve clockwise, or counter-clockwise, towards the driven gear 8 that is subject to the greatest resistance. The revolving spur gear 18, will cause the internal gear 2, to reciprocate slightly in a horizontal direction, being governed by the horizontal positioned elongated slots 9, in the hub flange 5. Referring to FIG. 1, therefore, the rotary movement of the spur gear 18, and the reciprocal motion of the internal gear 2, will cause the aligning shaft 20, bevel pinion gear 17, and the spur gear 18, to oscillate and conform to the pitch diameter of the internal gear 2, these parts all moving in unison. As the spur gear 18, and the internal gear 2, have no fixed centers, and their pitch diameters are of different proportions, an orbital course is formed by reciprocal and oscillating motion, to maintain constant contact of the two different pitch circles throughout the 360 degrees of movement.

Figure 3:
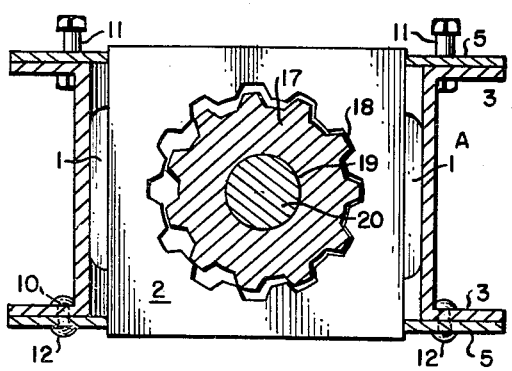
FIG. 3 is a sectional view taken on the line 3—3 of FIG. 1.

Referring to FIG. 3, line 3—3, it will be seen the internal gear 2, and the spur gear 18, are centrally aligned with the rotating direction of the casing A, any change of alignment from this position caused by the rotation of the spur gear 18, will represent a change in leverage, by rotating the spur gear 18, 7 degrees. The forces of energy, and the resisting forces are positioned in central alignment action with the spur gear 18, and the driven gear 8, thus, causing one of the driven gears 8, to receive all the energy, providing, the other driven gear 8, can offer no resistance. Referring to FIG. 3 it can be seen that the aligning shaft 20, bevel pinion gear 17, and the spur gear 18, oscillates back and forth, to the opposite side of the internal gear 2, to complete the cycle; at the same time the internal gear 2 reciprocates back and forth likewise, to complete the orbital course. When this internal gear 2 has reciprocated to engage the spur gear 18 at a position 90 degrees from central position, FIG. 3 in this position, the internal gear 2 is subjected to energy thrust of the casing A, the driven gear 8, will counteract this energy by resistance through the spur gear 18, thus, causing the spur gear 18 to come to rest between these equal forces, as these equal forces will be in central alignment. This position will be maintained until action of the other driven gear 8, moves it out of central alignment, as soon as it receives resistance. The spur gear 18 will proceed to revolve clockwise or anticlockwise depending on the driven gears 8, this revolving spur gear 18 will cause the internal gear 2 to reciprocate slightly and the reciprocating internal gear 2 will cause the spur gear 18 and the aligning shaft 20 to oscillate slightly. As the spur gear 18 and the internal gear 2 have no fixed centers and their circular pitch diameters are of different proportions an orbital course is formed through using reciprocal and oscillating motion to maintain constant contact of the two different pitch circles throughout the 360 degree of movement of the spur gear 18 and the internal gear 2. Referring to FIG. 3 it will be seen the internal gear 2 and the spur gear 18 are centrally aligned with rotating direction of the casing A. Any change of alignment from this position caused by the rotation of the spur gear 18 will represent a change in leverage, by rotating the spur gear 18—7 degrees it will bring the forces of energy and resisting forces in central alignment thus causing one driven gear 8 to receive all the energy, providing the other driven gear 8 can offer no resistance. As the casing A is revolved through a suitable means, it will be seen the bevel driven gears 8 revolve in the same direction as the casing A is rotated. It operates the same in opposite direction of rotation, yet the bevel driven gears 8 will operate independently in opposite directions, forward or backward, as would be necessary when applied to motor vehicles that are subject to different curvature directions and diameters. It is to be understood the equalizer is operational with one bevel pinion gear, one spur pinion gear, and one internal gear. Two are used for rigidity only.

Having set forth the nature of my invention, my claims are:

1. An automatic energy equalizer comprising, a cylindrical shaped casing flanged on both ends with connecting holes equally spaced on flanged faces, journal guides formed integral, and positioned parallel at 90 degree intervals, to extend laterally from the inner casing walls, hub flanges oppositely opposed and centrally aligned with connection holes, for enclosing the casing, elongated slots parallel and diametrically positioned opposite on the face of the hub flanges for journal guides, the outer portion of the hub supporting carrier bearings for casing rotation, the inner portion of the hub journaled to rotate the driven gears, the inner portion of the gear hubs centrally splined for connection with the axles for unit rotation, beveled pinion gears and beveled driven gears co-acting with an oscillating aligning shaft to form a balancing unit, beveled pinion gears positioned centrally and adjacent to, spur gears of equal circular and diametral pitch, having teeth with reduced addendum and dedendum to eliminate tooth interference, said spur gear co-acting with an internal gear diametrically centralized in a square journaled blank, and having one more tooth than the spur gear, said internal gear having reduced addendum and dedendum, and journaled for reciprocal motion induced by casing rotation, an internal gear that does not rotate on an axis, but has orbit rotation, the scope of the orbit being governed by the difference in pitch diameter of the internal gear and the spur gear, an aligning shaft journaled for oscillation, co-acting with internal gear and spur gear, to keep the two different pitch circles in constant contact, so that a 7 degree spur gear action will align energy to one driven gear.

2. An automatic energy equalizer comprising, a cylindrical shaped casing flanged on both ends with connection holes equally spaced on flanged faces, journal guides formed integral, and positioned parallel at 90 degree intervals, to extend laterally from the inner casing walls, hub flanges oppositely opposed and centrally aligned with connection holes, for enclosing the casing, elongated slots parallel and diametrically positioned opposite on the face of the hub flanges for journal guides, the outer portion of the hub supporting carrier bearings for casing rotation, the inner portion of the hub journaled to rotate the driven gears, the inner portion of the gear hubs centrally splined for connection with the axles for unit rotation, beveled pinion gears and beveled driven gears co-acting with an oscillating aligning shaft to form a balancing unit, beveled pinion gears positioned centrally and adjacent to, spur gears of equal circular and diametral pitch, having teeth with reduced addendum and dedendum to eliminate tooth interference, said spur gear co-acting with an internal gear diametrically centralized in a square journaled blank, and having one more tooth than the spur gear, said internal gear having reduced addendum and dedendum, and journaled for reciprocal motion induced by casing rotation, an internal gear that does not rotate on an axis, but has orbit rotation, the scope of the orbit being governed by the difference in pitch diameter of the internal gear and the spur gear, a square blank journaled for reciprocal motion out of alignment with casing rotation.

References Cited in the file of this patent

UNITED STATES PATENTS

| | | |
|---|---|---|
| 2,305,092 | Lawrence | Dec. 15, 1942 |
| 2,769,353 | Nash | Nov. 6, 1956 |

FOREIGN PATENTS

| | | |
|---|---|---|
| 738,913 | Germany | Sept. 4, 1943 |